(12) United States Patent
Tholl et al.

(10) Patent No.: US 8,605,147 B2
(45) Date of Patent: Dec. 10, 2013

(54) DEVICE FOR RECORDING IMAGES OF AN OBJECT SCENE

(75) Inventors: Hans Dieter Tholl, Uhldingen-Mühlhofen (DE); Eugen Romasew, Überlingen (DE); Joachim Barenz, Überlingen (DE)

(73) Assignee: Diehl BGT Defence GmbH & Co. KG, Ueberlingen (DE)

( * ) Notice: Subject to any disclaimer, the term of this patent is extended or adjusted under 35 U.S.C. 154(b) by 810 days.

(21) Appl. No.: 12/557,226

(22) Filed: Sep. 10, 2009

(65) Prior Publication Data

US 2010/0097459 A1    Apr. 22, 2010

(30) Foreign Application Priority Data

Oct. 17, 2008    (DE) .......................... 10 2008 052 064

(51) Int. Cl.
*H04N 7/18*    (2006.01)

(52) U.S. Cl.
USPC ......................................... 348/135; 348/370

(58) Field of Classification Search
USPC ......... 348/222.1, 51, 135, 370; 356/330, 445, 356/5.01, 5.04; 235/375; 345/84, 102; 361/707; 359/15, 9, 3; 382/154; 362/235
See application file for complete search history.

(56) References Cited

U.S. PATENT DOCUMENTS

| | | | | |
|---|---|---|---|---|
| 5,717,422 A | * | 2/1998 | Fergason | ...................... 345/102 |
| 5,768,461 A | | 6/1998 | Svetkoff et al. | |
| 6,057,909 A | * | 5/2000 | Yahav et al. | ................... 356/5.04 |
| 7,027,016 B2 | * | 4/2006 | Sakashita | ......................... 345/84 |
| 7,274,815 B1 | * | 9/2007 | Smithpeter et al. | ............ 382/154 |
| 7,355,648 B1 | | 4/2008 | Braun et al. | |
| 7,362,419 B2 | | 4/2008 | Kurihara et al. | |
| 7,777,878 B2 | * | 8/2010 | Liphardt | ........................ 356/330 |
| 2003/0067539 A1 | * | 4/2003 | Doerfel et al. | ................... 348/51 |
| 2005/0111726 A1 | | 5/2005 | Hackney et al. | |
| 2005/0122549 A1 | * | 6/2005 | Goulanian et al. | ................. 359/3 |
| 2006/0227317 A1 | | 10/2006 | Henderson et al. | |

(Continued)

FOREIGN PATENT DOCUMENTS

DE         10156282 A1    6/2003
DE    102005021808 A1   11/2006

(Continued)

OTHER PUBLICATIONS

Kim et al, Design and Calibration of a Multi-view TOF Sensor Fusion System, Computer Society Conference on, IEEE, Jun. 23, 2008.
Marszalec et al.,"Range Imaging Sensor with Moving Parts", Proceedings of Spie,vol. 2783, Aug. 26, 1996.

*Primary Examiner* — Jungwon Chang
(74) *Attorney, Agent, or Firm* — Laurence A. Greenberg; Werner H. Stemer; Ralph E. Locher

(57) ABSTRACT

A device for recording images of an object scene has a lighting unit for illuminating the object scene with several lighting elements and an optical system for directing radiation of the lighting elements reflected from the object scene onto a detector. In order to achieve a simple and compact camera, the device includes a marking device for marking the radiation from each of the lighting elements and an evaluation device for differentiating the reflected radiation of the individual lighting elements by way of the marking.

16 Claims, 2 Drawing Sheets

(56) References Cited

U.S. PATENT DOCUMENTS

| | | | |
|---|---|---|---|
| 2006/0256341 A1* | 11/2006 | Kuwada | 356/445 |
| 2006/0256413 A1* | 11/2006 | Kitamura | 359/15 |
| 2007/0171617 A1* | 7/2007 | Lee | 361/707 |
| 2008/0019127 A1* | 1/2008 | Dick et al. | 362/235 |
| 2008/0144000 A1 | 6/2008 | Thun et al. | |
| 2009/0115993 A1* | 5/2009 | Doemens et al. | 356/5.01 |
| 2010/0103256 A1* | 4/2010 | Rauber | 348/92 |
| 2010/0200649 A1* | 8/2010 | Callegari et al. | 235/375 |
| 2011/0122272 A1* | 5/2011 | Fergason | 348/222.1 |

FOREIGN PATENT DOCUMENTS

| | | |
|---|---|---|
| DE | 102005028570 A1 | 12/2006 |
| DE | 102005049471 A1 | 5/2007 |
| DE | 102006029025 A1 | 12/2007 |
| DE | 102007012624 B3 | 6/2008 |
| DE | 602005006080 T2 | 5/2009 |

* cited by examiner

DEVICE FOR RECORDING IMAGES OF AN OBJECT SCENE

CROSS-REFERENCE TO RELATED APPLICATION

This application claims the priority, under 35 U.S.C. §119, of German patent application DE 10 2008 052 064.0, filed Oct. 17, 2008; the prior application is herewith incorporated by reference in its entirety.

BACKGROUND OF THE INVENTION

Field of the Invention

The invention relates to a device for recording images of an object scene with a lighting unit for illuminating the object scene with several lighting elements and an optical system for directing radiation of the lighting elements reflected from the object scene onto a detector.

Laser radars, i.e. sensors, which perform a depth sampling, usually work with a modulated laser source and a single-element detector, which are focused on an element in spot mode or are scanned over a scene. If the time interval between two scan positions is sufficiently long, there can be an evaluation of the complete time signal as for microwave radar. If the scan movement occurs with high angular velocity, i.e. a high image rate, then the laser modulation is reduced to a sequence of short pulses, and the signal processing to the evaluations of the propagation time of a few distinctive echoes.

SUMMARY OF THE INVENTION

It is accordingly an object of the invention to provide a device for recording images of an object scene which overcomes the disadvantages of the heretofore-known devices and methods of this general type and which provides for a simple device with which recordings of images of an object scene can be made, in particular images which contain depth information.

With the foregoing and other objects in view there is provided, in accordance with the invention, a device for recording images of an object scene, comprising:

a lighting unit for illuminating the object scene, said lighting unit having a plurality of lighting elements;

a detector;

an optical system configured to direct radiation of the lighting elements reflected from the object scene onto said detector;

a marking device for marking the radiation from each of said lighting elements; and an evaluation device for differentiating the reflected radiation of the individual said lighting elements by way of the marking.

In other words, the objects of the invention are achieved with a device that includes a marking device, or marking means, for marking the radiation from each of the lighting elements and an evaluation device, or evaluation means, for differentiating the reflected radiation of the individual lighting elements by way of the marking. As a result of the plurality of the lighting elements, the object scene can be illuminated simultaneously or sequentially by the lighting elements, the marking allowing a correlation of the received signals to the individual lighting elements during the evaluation of the recorded images. A scanning mechanism can thereby be omitted, and the device can be kept simple. Furthermore, simple detectors can be used, as the angle of the individual signals can be assigned solely or additionally with the help of the marking of the radiation.

The images of the object scene can be one, two, or three-dimensional, can be extensive or consist only of individual pixels spaced apart from one another, and advantageously include depth information. The device is usefully a laser radar, and the lighting elements are preferably laser elements for emitting laser radiation. The frequency of the radiation, in a preferred embodiment, lies in the infrared spectral range.

In an especially simple and economical execution of the device, the optical system is designed to direct the entire reflected radiation of the lighting elements, which is to be evaluated for an image generation, onto a single detector cell of the detector. This usefully comprises only this one detector cell. From the detector cell signal, which combines the image information of the reflected radiation of all lighting elements, the evaluation means can divide the image information with the help of the marking into separate channels, which are each assigned to one lighting element. If the image area or pixel into which the radiation of any one lighting element was sent is known, then an image, two-dimensional for example, can be created with the help of only one detector cell. A detector cell can be understood in the following as a radiation-sensitive element, which comprises one or more signal outputs, all signal outputs of the element reacting to a punctiform illumination of the element with a signal corresponding to the illumination.

The marking can be done by transmission time marking. For this purpose, the marking means are advantageously provided for assigning unique transmission time windows for each lighting element. The transmission time marking can be effected by a time-sequential activation of the lighting elements, so that a time division multiplex of independent rangefinders can result.

In an especially advantageous embodiment of the invention, the marking is a ray frequency marking, the lighting elements being designed to emit with a different frequency in each case. The frequency can be the carrier frequency of the lighting elements, so that for the marking the carrier frequencies of all lighting elements differ from one another. Instead of or in addition to the carrier frequencies, modulation frequencies can be utilized for the marking. The use of different frequency areas, for example with different frequency chirps, is possible. If the lighting elements themselves radiate with differing radiation frequencies or carrier frequencies, the lighting unit can be the marking means at the same time. It is likewise possible that the marking means is a control, which sets ray frequencies, e.g. by modulations or the setting of optical elements.

The evaluation means is advantageously executed to assign information from a marking analysis from the reflected radiation to a position in an image of the object scene. Thus the evaluation means can be designed, for example, to carry out the separation of the individual angled channels by a frequency analysis of the signal from the detector. By means of the generation of angle information and/or position information from the marking analysis, an image, and in particular a multidimensional image of the object scene can be generated from signals carrying a single item of information or just a few.

To generate a multidimensional image in particular of the object scene, it is advantageous if the optical system is designed to direct the radiation of the individual lighting sources into a separate area of the object scene in each case. The areas differ in their position in the object scene, and advisably overlap little or not at all. The areas can be multidimensionally extended areas, or punctiform and for example distanced from one another. The areas are usefully disposed in raster form, i.e. uniformly in a one- or two-dimensional grid, where a raster point can be a focal point or a geometric center of an area.

The optical system can be executed especially easily if the lighting elements are disposed in a raster. The optical system can thus transform the grid into an angular grid, which is especially easy to evaluate.

At the same time the lighting elements can be radiation generating lighting sources, for example individual laser sources. It is also possible that the lighting elements receive radiation from one or more lighting sources and direct it into the object scene with the help of the optical system.

Advantageously, each lighting element is assigned a separate lighting source, so that frequency marking can take place directly using the lighting source. It is also possible that each lighting element is equipped with an associated modulation means, assigned only to this lighting element. The modulation means can be an interference filter, in particular a tunable interference filter, which is advantageously implemented with micro-optical elements, which are usefully disposed in a raster. In this embodiment of this invention, the lighting source can be an expanded laser beam, which usefully irradiates all modulation means, and whose radiation can be used by all lighting elements. A further suitable modulation means is the Bragg cell, which can be illuminated with a laser beam. The different diffraction orders have different optical carrier frequencies, which can be mixed before the detection with a local oscillator for the marking analysis.

In a further advantageous embodiment of the invention, the device includes a modulation means for time modulating of the radiation of the lighting elements, the evaluation means being provided for determining depth information from an image of the object scene with the help of the modulation. The evaluation can be with a propagation time measurement, in particular with long pulses, with characteristic intrinsic modulation. A continuous illumination is also possible. The evaluation is usefully carried out by a correlation with an electronic reference signal. The radiation from each lighting element is advantageously modulated in a manner that permits the propagation time of an echo to be determined. It is also possible to sample the associated time signal at regular intervals, and thus create a three-dimensional volume image. In this way there can be a screening of a three-dimensional object space in voxels. Several methods of modulation are known from radar technology for the determination of propagation time and for depth resolution.

It is also suggested that the detector has a position sensitive detector cell. The reflected radiation from the lighting elements is usefully directed onto this. The position sensitive detector cell can be a lateral effect photodiode. The optical system is usefully executed such that the radiation from the entire illuminated angular range leads to the detector cell, so that the entire illuminated angular range can be registered.

The evaluation means is advantageously provided to perform a position assignment of radiation information from the individual lighting elements, from the marking information and the signals of the position sensitive detector cell. A multidimensional image can also be generated in this way, with the help of a single detector cell, without the need to use any information on the transmit direction of the individual lighting elements. The position assignment in the image, or angle discrimination, can take place in each marking or carrier frequency by the measurement of the respective area focuses of the irradiances.

Other features which are considered as characteristic for the invention are set forth in the appended claims.

Although the invention is illustrated and described herein as embodied in a device for recording images of an object scene, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
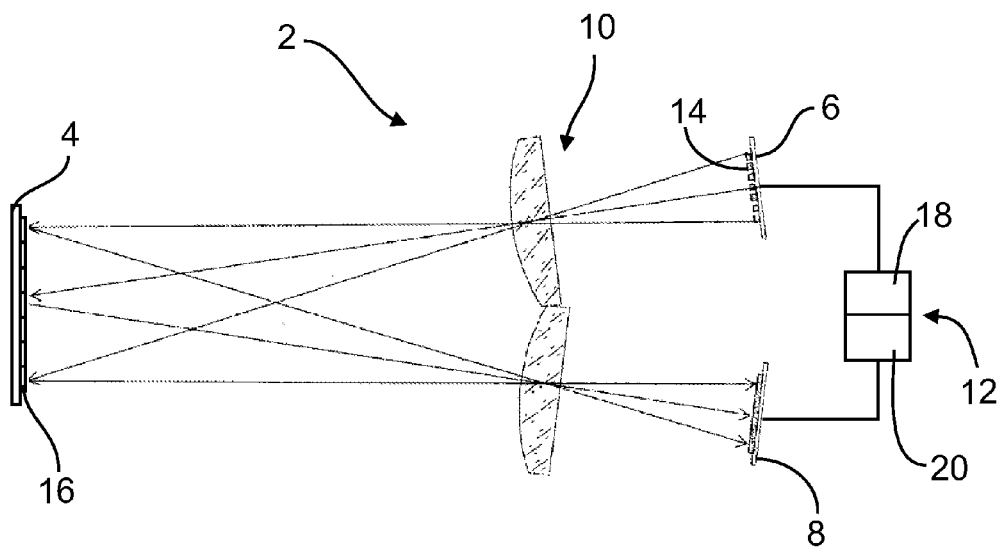
FIG. 1 is a schematic overview representation of a device for recording images of an object scene with the help of several lighting sources and a single detector cell.

Referring now to the figures of the drawing in detail and first, particularly, to FIG. 1 thereof, there is shown a device 2 for recording images of an object scene 4 with a lighting unit 6, a detector 8, and an optical system 10 for directing radiation from the lighting element 6 into the object scene 4 and radiation reflected from the object scene 4 onto the detector 8. In this exemplary camera, the transmit and receive apertures are shown separated for greater clarity. A common aperture is likewise possible, and involves lower cost in optical isolation compared to a pulse system. The peak power of the radiation—especially laser radiation—can be kept low, as the necessary energy is based on the pulse length, and the coding for the propagation time measurement is based on a time modulation.

The lighting unit 6 includes a right-angled grid of a large number of lighting elements 14, which are each executed as laser radiators and thus simultaneously form lighting sources. With the help of this laser grid the object scene 4 is illuminated, the activation of the laser grid taking place with the help of a control unit 12. In FIG. 1, only the principal rays of the optical mapping of the laser grid on the detector 8 are shown. Instead of the laser grid, a grid of LEDs or another raster-form lighting unit can also be used. For all lighting grids, it is advantageous if each lighting element of the grid is individually marked.

The radiation from the lighting unit 6 is conducted by the optical system 10 into the object scene 4, each lighting element 14 illuminating one area 16 of the object scene. The assignment of each single area 16 to one lighting element 14 is unique, so that each lighting element 14 illuminates exactly one area 16. The areas 16 are disposed in a raster (screen array) in the object scene 4, in particular in the same raster form (array) in which the lighting elements 14 are disposed.

The object scene 4, or the individual areas 16, are mapped by the optical system 10 onto the detector 8. Each area 16 of the object scene 4 is thereby assigned an image area on the detector 8, so that the areas 16 disposed in a raster are also mapped in raster form on the detector 8.

The radiation from the individual lighting elements 14 is marked with the help of an electronic marking means in such a form that each lighting element 14 is also identifiable by the radiation emitted by it. In the example shown in FIG. 1, the radiation is intrinsically modulated, in that an individual carrier element is assigned to each lighting element. The radiation is thus already modulated during creation in the semiconductor. Other modulations are also alternatively possible, e.g. external modulations, as by a hologram or a spatial light modulator, with which a spatial modulation is applied to the radiation. Micro-optical tunable interference filters are also possible, whose optical distances from the reflecting surfaces are modulated independently of one another.

Figure 2:
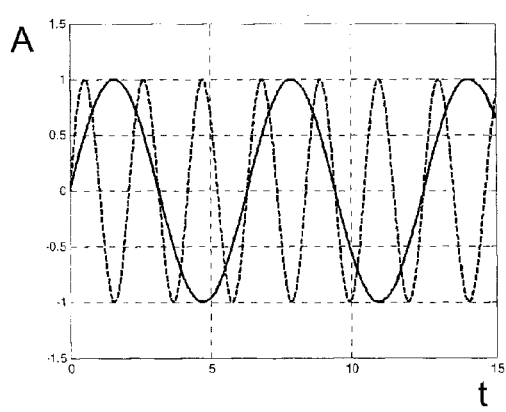
FIG. 2 is a diagram with two different lighting carrier frequencies.
Figure 3:
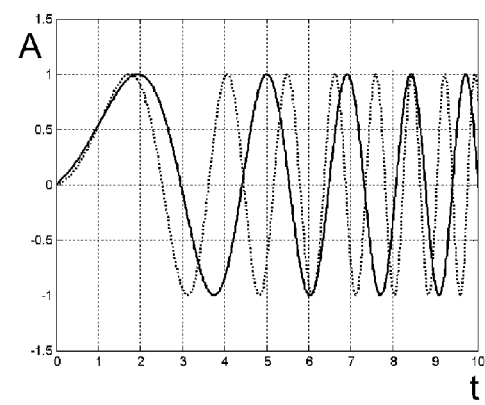
FIG. 3 is a diagram with two frequency chirps with different frequencies.

Two examples of possible markings are reproduced in FIGS. 2 and 3. The amplitudes A of radiation from two lighting elements 14 over the time t are shown in FIGS. 2 and 3. The markings in both examples are frequency modulations. In FIG. 2 the carrier frequency of both lighting elements 14 is constant, but different. In FIG. 3, both lighting elements 14 radiate with a frequency chirp in each case, each element covering a fixed frequency range.

Figure 4:
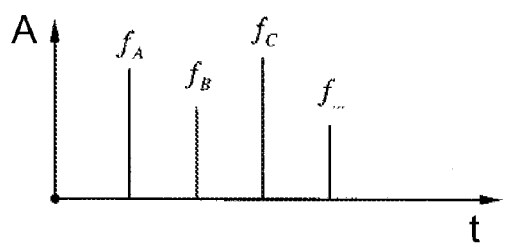
FIG. 4 is a frequency diagram with sharp frequencies analogous to FIG. 2.
Figure 5:
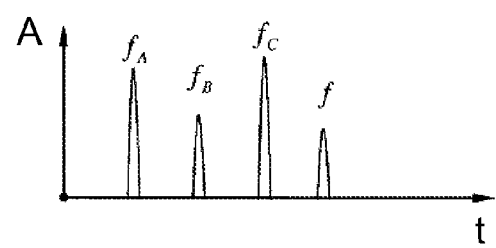
FIG. 5 is a frequency diagram with frequency areas analogous to FIG. 3.

The sharp frequencies or frequency ranges are shown in the diagrams of FIGS. 4 and 5. The sharp frequencies $f_A$, $f_B$, $f_C$, f . . . are so far distant from each other that they can be evaluated separately from each other by the evaluation means 20. Similarly, the frequency ranges or bands of the frequency chirps shown in FIG. 5 are not executed overlapping, but rather distanced so far from each other that they too can be uniquely evaluated independently of one another by the evaluation means 20.

In the frequency chirp method, a base frequency is linearly increased over time, as is represented in FIG. 3. The line spectrum of the carrier frequencies is widened by the chirp into frequency bands, which are shown in FIG. 5. The width of the frequency bands determines the minimum distance between the carrier frequencies of the individual lighting elements 14.

Alternatively or additionally to a frequency modulation, simple phase measurements, of an amplitude modulation, a phase modulation or pulse compression methods would also be suitable.

The detector 8 is a single-cell detector with a single detector cell, to which radiation of all lighting elements 14 reflected from the object scene 4 is directed. The detector 8 is usefully disposed in an image plane of the optical system 10, a deviation of maximum 10% of the focal length of the optical system 10 being acceptable as still in the image plane.

The signal which is output from the detector 8 resulting from the illumination is evaluated by an evaluation means 20, which can be part of the control unit 12. This signal contains information from all illuminated areas 16, as the detector 8 combines radiation information from all illuminated areas 16 into one or more signals, which each contain information from all areas 16. From the signal or individual signals, it is however possible to differentiate the individual lighting elements 14 or areas by the marking. The evaluation means 20 performs this differentiation. In this manner the evaluation means 20 can assign information from the individual areas 16 to a respective channel, from which—by the known arrangement of the areas 16 in the object scene 4—an image of the object scene 4 can be composed. Each area 16 can thus supply a pixel, so that an image, two-dimensional for example, can be generated from the totality of the pixels.

Figure 6:
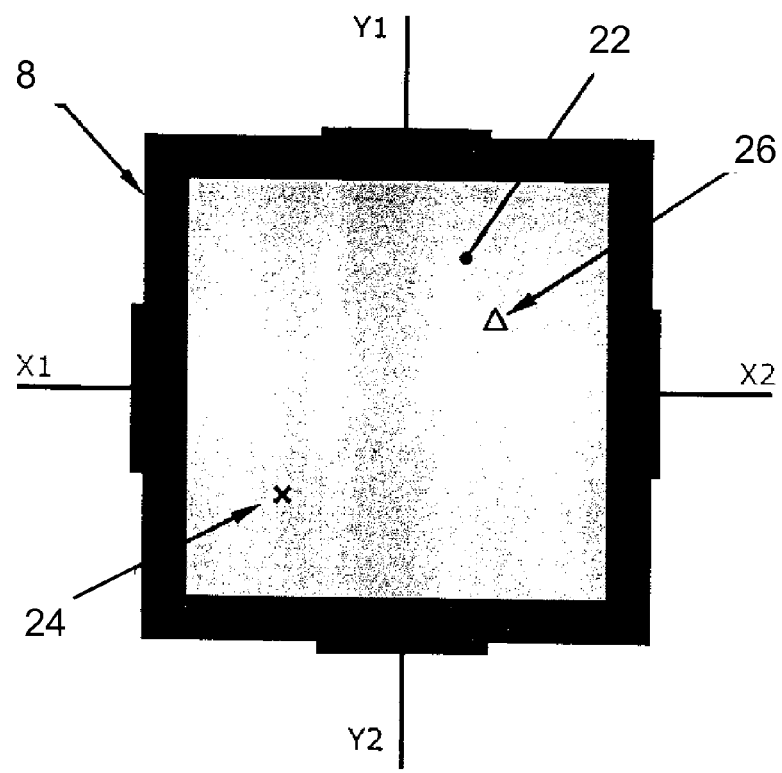
FIG. 6 is a schematic representation of a position sensitive detector cell.

An additional position discrimination or angle discrimination is possible when using a position sensitive detector cell, for example a lateral effect photodiode, as shown in more detail in FIG. 6. When light falls on the active surface 22 of the photodiode, a photoelectric current is generated, which flows in the direction of the p- and the n-doped region. In contrast to a simple photodiode, a lateral effect photodiode has several electrical contacts, for example four electrical contacts or electrodes $X_1$, $X_2$, $Y_1$, $Y_2$. This leads to a split of the photoelectric current to these electrodes dependent on the position of the focus of the irradiance of the light spot or radiation. The position in the x and y direction is determined by forming the difference in current between two opposing electrodes. Through scaling on the total current, the position signal becomes independent of the incident light intensity. In this manner an irradiation with the focus in a first position 24 can be distinguished from the irradiation with the focus in a second position 26.

The position sensitive detector cell measures the focus of the irradiance within the detector surface 22, shown as an example using two different positions 24 and 26. The inner structure of the irradiance distribution, e.g. the image information, can be extracted with the detector cell, if the structure parts can be separated from one another by means of a marking, e.g. time or frequency related features. For example, if each lighting element 14 is distinguished by a different carrier frequency, then each carrier frequency corresponds to a direction in the object space. The evaluation means 20 separates the individual carrier frequencies into different channels, which are processed independently of each other. The positions 24, 26 are then determined on the active surface 22 of the detector cell for each detected carrier frequency. As a result of the mapping of the object scene 4 onto the detector 8 or its detector cell, each position 24, 26 corresponds to a position within the object scene 4 or an area 16.

With the separability of the frequencies and the consequently enabled position determination on the active surface 22 of the detector 8, it is thus possible to determine a position or angle for the individual areas 16 even without knowledge or use of the radiation information of the lighting unit 6. An image of the object scene 4 can also be composed even if the type of radiation is unknown or disturbed.

In addition to the marking, the radiation from each lighting element 14 is modulated such that the propagation time of an echo can be determined, and distance images can thus be generated with the help of the echo method. It is also possible to sample the associated time signal at regular intervals, and thus create a three-dimensional volume image by a screening of the three-dimensional object space in voxels. Several methods of modulation are known from radar technology for the determination of propagation time and for depth resolution. A further possible method for obtaining three-dimensional information is a pseudo-noise coding.

After the depth information is obtained, it can be merged with the position data or angle-angle data of the position determination. The result of the data merge is a three-dimensional image resolved by angle and distance.

The invention claimed is:
1. A device for recording images of an object scene, comprising:
   a lighting unit for illuminating the object scene, said lighting unit having a plurality of lighting elements;
   a detector including a position-sensitive detector cell;

an optical system configured to direct radiation of the lighting elements reflected from the object scene onto said detector;

a marking device for marking the radiation from each of said lighting elements; and an evaluation device for differentiating the reflected radiation of the individual said lighting elements by way of the marking.

2. The device according to claim 1, wherein said optical system is configured to direct an entirety of the reflected radiation of the lighting elements, to be evaluated for an image generation, onto a single detector cell of said detector.

3. The device according to claim 1, wherein the marking is transmission time marking and said marking device is configured to assign unique transmission time windows for each lighting element.

4. The device according to claim 1, wherein the marking is a ray frequency marking and said lighting elements are configured to emit with a different frequency in each case.

5. The device according to claim 1, wherein said evaluation device is configured to assign information from a marking analysis of the reflected radiation to a position in an image of the object scene.

6. The device according to claim 5, wherein said evaluation device is configured to generate an image from a plurality of position assignments.

7. The device according to claim 1, wherein said optical system is configured to direct the radiation of the individual lighting elements into a separate area of the object scene in each case.

8. The device according to claim 1, wherein said optical system is configured to direct radiation from said lighting elements in raster form into the object scene, with each said lighting element illuminating exactly one raster point.

9. The device according to claim 1, wherein said lighting elements are disposed in a raster array.

10. The device according to claim 1, wherein each said lighting element comprises a separate lighting source.

11. The device according to claim 1, wherein each said lighting element is equipped with a respective modulation means, which is assigned only to the respective said lighting element.

12. The device according to claim 1, which comprises modulation means for time modulating the radiation of said lighting elements, and wherein said evaluation device is configured for determining depth information from an image of the object scene with the help of the modulation.

13. The device according to claim 1, wherein said evaluation device is configured to perform a position assignment of radiation information from the individual said lighting elements, from marking information and signals of said position sensitive detector cell.

14. A device for recording images of an object scene, comprising:

a lighting unit for illuminating the object scene by irradiating the object scene with radiation from a plurality of lighting elements;

a marking device for marking the radiation from each of said lighting elements in order to enable a unique identification of a respective said lighting element as being a source of the radiation;

a detector including a position-sensitive detector cell;

an optical system configured to direct the radiation, after reflection thereof from the object scene, onto said detector; and an evaluation device for differentiating the reflected radiation of the individual said lighting elements by way of the marking and for assembling an image of the object scene from the reflected radiation.

15. The device according to claim 14, wherein the marking is transmission time marking and said marking device is configured to assign unique transmission time windows for each lighting element.

16. The device according to claim 14, wherein the marking is a ray frequency marking and said lighting elements are configured to emit with a different frequency in each case.

* * * * *